(12) United States Patent
Derval et al.

(10) Patent No.: US 12,551,667 B2
(45) Date of Patent: Feb. 17, 2026

(54) CATHETER, INFLATABLE BALLOON FOR A CATHETER

(71) Applicants: UNIVERSITE DE BORDEAUX, Bordeaux (FR); CENTRE HOSPITALIER UNIVERSITAIRE DE BORDEAUX, Talence (FR); FONDATION BORDEAUX UNIVERSITÉ, Bordeaux (FR); INSTITUT NATIONAL DE LA SANTE ET DE LA RECHERCHE MEDICALE—INSERM, Paris (FR)

(72) Inventors: Nicolas Derval, Bordeaux (FR); Pierre Jais, Saint Medard en Jalles (FR); Arnaud Denis, Bordeaux (FR); Thomas Pambrun, Talence (FR); Josselin Duchateau, Talence (FR)

(73) Assignees: UNIVERSITE DE BORDEAUX, Bordeaux (FR); CENTRE HOSPITALIER UNIVERSITAIRE DE BORDEAUX, Talence (FR); FONDATION BORDEAUX UNIVERSITE, Bordeaux (FR); INSTITUT NATIONAL DE LA SANTE ET DE LA RECHERCHE MEDICALE—INSERM, Paris (FR)

( * ) Notice: Subject to any disclaimer, the term of this patent is extended or adjusted under 35 U.S.C. 154(b) by 1058 days.

(21) Appl. No.: 17/052,416

(22) PCT Filed: May 2, 2019

(86) PCT No.: PCT/EP2019/061209
§ 371 (c)(1),
(2) Date: Nov. 2, 2020

(87) PCT Pub. No.: WO2019/211362
PCT Pub. Date: Nov. 7, 2019

(65) Prior Publication Data
US 2021/0236779 A1    Aug. 5, 2021

(30) Foreign Application Priority Data
May 4, 2018  (FR) ...................................... 1800428

(51) Int. Cl.
*A61M 25/10*   (2013.01)

(52) U.S. Cl.
CPC ....... *A61M 25/10* (2013.01); *A61M 2025/105* (2013.01); *A61M 2230/08* (2013.01)

(58) Field of Classification Search
CPC .......... A61M 25/10; A61M 2025/1045; A61M 2025/105; A61M 2025/1052;
(Continued)

(56) References Cited

U.S. PATENT DOCUMENTS 4,351,342 A  *  9/1982  Wiita ................. A61M 25/1002
                                                604/103
4,696,304 A  *  9/1987  Chin ...................... A61B 5/028
                                                604/523
(Continued)

FOREIGN PATENT DOCUMENTS

CN       104665922 A      6/2015
EP       0 567 788 A1    11/1993
(Continued)

OTHER PUBLICATIONS

Notification of Reasons for Refusal as issued in Japanese Patent Application No. 2020-561704, dated Mar. 22, 2023.
(Continued)

*Primary Examiner* — Michael J Tsai
*Assistant Examiner* — William R Frehe
(74) *Attorney, Agent, or Firm* — Pillsbury Winthrop Shaw Pittman LLP

(57) ABSTRACT

A medical device includes a catheter and a balloon, the device including a first lumen for injection of a first volume
(Continued)

of a treatment solution and a second lumen for injection of a second volume including a gas or a liquid for inflation of a balloon. The balloon is fixed on a portion of the distal end of the catheter, the balloon including an opening to permit entry of the second volume in order to ensure the inflation thereof via the second lumen and including a predefined inflation shape defining a channel that opens out laterally with respect to the main axis of the catheter.

12 Claims, 10 Drawing Sheets

(58) Field of Classification Search
CPC ...... A61M 2230/08; A61M 2025/0175; A61M 2025/091
See application file for complete search history.

(56) References Cited

U.S. PATENT DOCUMENTS

| | | | |
|---|---|---|---|
| 4,994,032 A | | 2/1991 | Sugiyama et al. |
| 5,795,331 A | | 8/1998 | Cragg et al. |
| 5,833,658 A | * | 11/1998 | Levy .................. A61M 25/1011 |
| | | | 606/108 |
| 2006/0041225 A1 | | 2/2006 | Wallace et al. |
| 2007/0016241 A1 | * | 1/2007 | von Oepen .......... A61M 25/104 |
| | | | 606/192 |
| 2012/0065633 A1 | * | 3/2012 | Yagi ...................... A61B 18/04 |
| | | | 606/28 |
| 2012/0253278 A1 | | 10/2012 | Ise |
| 2013/0303897 A1 | | 11/2013 | Pursley |
| 2017/0252560 A1 | * | 9/2017 | Imran ................ A61M 25/0108 |
| 2021/0077182 A1 | * | 3/2021 | Toth .................... A61M 25/0113 |

FOREIGN PATENT DOCUMENTS

| | | |
|---|---|---|
| JP | 2012-205697 A | 10/2012 |
| JP | 2017-104547 A | 6/2017 |
| WO | WO 2006/093273 A1 | 9/2006 |

OTHER PUBLICATIONS

International Search Report as issued in International Patent Application No. PCT/EP2019/061209, dated Jul. 17, 2019.
First Office Action as issued in Chinese Patent Application No. 201980030073.6, dated Dec. 1, 2021.
Notification of Reasons for Refusal as issued in Japanese Patent Application No. 2020-561704, dated Jan. 9, 2024.
DR Office Action as issued in Canadian Patent Application No. 3,097,085, dated Sep. 29, 2025.

* cited by examiner

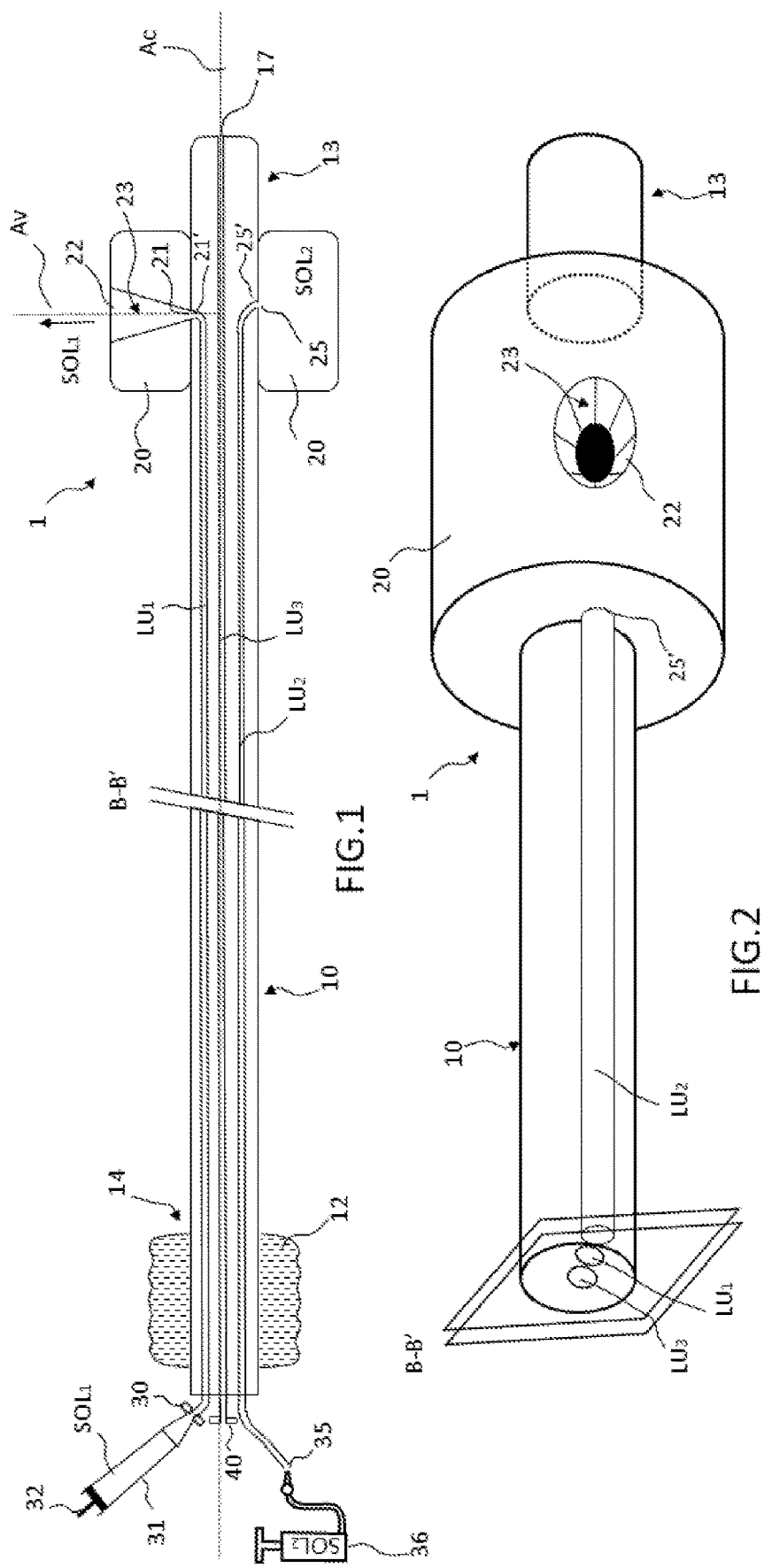

CATHETER, INFLATABLE BALLOON FOR A CATHETER

CROSS-REFERENCE TO RELATED APPLICATIONS

This application is the U.S. National Stage of PCT/EP2019/061209, filed May 2, 2019, which in turn claims priority to French patent application number 1800428 filed May 4, 2018. The content of these applications are incorporated herein by reference in their entireties.

FIELD

The field of the invention relates to devices for introducing a solution into a channel of the human body, more particularly vessels and in particular the vein of Marshall. The field of the invention relates to devices for the treatment of certain cardiac pathologies. More particularly, the field of the invention relates to that of catheters comprising a means for directing a solution to be injected into a channel for example of the vein of Marshall type.

STATE OF THE ART

Today, the vein of Marshall is involved in the causes of the occurrence of cardiac pathologies of the cardiac fibrillation type such as atrial fibrillation, called AF. The vein of Marshall is a vein of the heart that a priori is not necessary, but due to its implication in the occurrence of certain pathologies, it is treated during the execution of an act of interventional cardiology at the heart.

Atrial fibrillation AF is an arrhythmia defined by a chaotic activation of the atria. It is triggered by atrial extrasystoles that initiate multiple and variable re-entries. The pulmonary veins, source of extrasystoles and a substrate for the re-entries, are recognized as the fundamental structures at the initiation and in the maintaining of atrial fibrillation. They are therefore the main target of the ablation. Other structures have similar characteristics: superior vena cava, coronary sinus, ligament of Marshall. Although the first two can be treated by the ablation, the ligament of Marshall is not readily accessible by this type of treatment.

The ligament of Marshall is an embryonic remnant resulting from the involution of the left superior vena cava and the musculature thereof. The incomplete apoptosis of the venous musculature leads to the persistence of several muscular connections between the endocardium and the epicardium. The ligament of Marshall is therefore comprised of a venous network of small caliber, also called "vein of Marshall", closely associated with a muscular arborization. This complex structure is propitious to the initiation and to the maintaining of the atrial fibrillation through automaticity and re-entry mechanisms. Winding between the left pulmonary veins and the left atrium, the vein of Marshall joins with the great cardiac vein to anastomose in the coronary sinus. However, as with all veins, it is subject to anatomical path variations.

Because of the fact that it is difficult to treat the vein of Marshall by endocardial ablation—in particular because it is electrically insulated in a fat mass—or epicardial ablation (its very limited diameter does not allow for the introduction of an ablation catheter), other treatment techniques have been investigated.

One of the treatment methods used to date to reduce the implication of the vein of Marshall in the appearance of cardiac fibrillation is the introduction of a solution of the alcohol type into the vein.

Currently, there are catheters for introducing a treatment solution into the vein of Marshall. The existing catheters generally have a main lumen and a second lumen guided to be introduced into the vein of Marshall. However, in order to secure the handling and ensure that the second lumen is indeed introduced, it is necessary for a surgeon or an operator to sufficiently introduce the lumen inside the vein of Marshall.

This action has for consequence an impossibility of treating the zone of the vein located at the anastomosis of the latter with the main vein of the network in which the lumen is introduced. Consequently, the vein of Marshall is partially treated and most often the symptoms are only partially removed.

This problem is not localized to the sole case of the vein of Marshall, there is a need for a catheter and/or an element allowing for the introduction of a treatment solution in veins of small diameters and that open out onto an access vein that makes it possible to treat the anastomosis zone of the vessel 41 and of the vessel 42.

SUMMARY OF THE INVENTION

The method of the invention makes it possible to resolve the aforementioned problems.

According to an aspect, the invention relates to a medical device comprising a catheter and a balloon arranged on a portion of the distal end of the catheter,
the device comprising:
   a first lumen for injection of a first volume of a treatment solution, the first lumen that opens out laterally onto a first distal opening of the catheter;
   a second lumen for injection in order to convey a second volume comprising a gas or a liquid for inflation of the balloon;
said balloon comprising:
   an opening intended to cooperate with a distal opening of the second lumen to permit entry of the second volume in the balloon in order to ensure the inflation thereof and;
   a channel that opens out laterally with respect to the longitudinal axis of the catheter, the channel being intended to cooperate with the first opening of the catheter in order to ensure the entry of the first volume in said channel.

An advantage is to allow for the introduction of a volume of alcohol into a localized region inside the vein of Marshall and at the anastomosis thereof while still guaranteeing a seal of the treated zone thanks to the inflation of the balloon.

According to an embodiment, said balloon is intended to form a sealed contact with the wall of a vessel.

According to an embodiment, the channel opens out laterally with respect to the longitudinal axis of the catheter in the extension of a lateral opening of said catheter.

According to an embodiment, a portion of the body of the catheter forms a wall of the volume obtained after inflation of the balloon.

According to an embodiment, the balloon comprises at least two channels that open out laterally with respect to the longitudinal axis of the catheter in the extension of a lateral opening of said catheter, each channel being intended to cooperate with a first opening of the catheter to permit entry of the first volume in at least one channel, each first opening cooperating with a lumen of the catheter.

According to an embodiment, the balloon comprises at least one reinforcing element to preform at least one channel.

According to an embodiment, the balloon comprises a circumferential lip arranged at the distal end of the channel, said lip making it possible to carry out a local increase in the thickness of the balloon.

According to an embodiment, the channel comprises a flared opening of which the aperture angle is greater than 90°.

According to an embodiment, the balloon is fixed on a movable portion of the catheter, said movable portion being rotatably mounted about the main axis of the catheter.

According to an embodiment, the catheter comprises a second opening cooperating on the one hand with the distal end of the second lumen and on the other hand with the opening of the balloon, the catheter comprising the second lumen. An advantage is to allow for the inflation of the balloon when the latter is correctly positioned. The inflation can then be carried out from a lumen integrated into the catheter. Thus, the invention allows for the introduction of a single catheter body that fulfils the functions that make it possible to carry out all the steps of the alcoholization of the vein of Marshall and of the anastomosis thereof.

According to an embodiment, the device comprises a third lumen suitable for the passage of a guide or of a liquid solution, said third lumen opening out onto a distal opening of the catheter. An advantage is to allow for the introduction of a guide into the same catheter body. This solution improves the guiding and the positioning of the device comprising the balloon.

According to an embodiment:
the first lumen comprises a diameter comprised between 2 F and 5 F, preferably 4 F, and;
the second lumen comprises a diameter comprised between 1 F and 1.5 F, preferably 1.2 F.

An advantage is that the dimensions respect the dimensional and physiological constraints of the vessels of the region of the coronary sinus and of the vein of Marshall while still allowing for the introduction of the elements that allow for the guiding of the catheter, the inflation of the balloon and the introduction of a treatment solution.

According to an embodiment, the lateral channel that opens out is flared in such a way that the average diameter of the lateral opening is greater than the average diameter of the inlet of the channel. An advantage is to favor the flow of a solution of alcohol in the anastomosis zone of the vein of Marshall.

According to an embodiment, the balloon comprises an outer diameter suitable for forming a sealed contact with a wall of a first vessel when the balloon is inflated in such a way as to ensure the seal between the channel and the entry of a second vessel and making it possible to deliver, at an anastomosis of a second vessel with the first vessel, a first volume of a solution. An advantage is to ensure the seal of the region treated with the other regions of the coronary sinus.

According to an embodiment, the catheter comprises at least one electrode arranged at the surface of the distal end of the body of the catheter making it possible to record the electrical activity in the vessel. An advantage is to allow for the control of an electrical response of a tissue at the beginning of the treatment in order to validate a zone to be treated. Another advantage can be to control at the end of the treatment that the region has been treated.

According to another aspect, the invention relates to an inflatable balloon including an inner surface intended to extend over a portion of the circumference of a catheter and an outer surface that defines its largest diameter when it is inflated, said balloon comprises a lateral channel passing through the balloon and opening out laterally at the longitudinal axis of the catheter. An advantage is to adapt a balloon to an existing catheter in order to propose a new medical device that allows for the treatment of vessels by the introduction of a volume of alcohol or any other treatment solution that has to be introduced locally.

According to an embodiment, the balloon is intended to form a sealed contact with the wall of a vessel.

According to an embodiment, the lateral channel passing through the balloon opens out laterally at the longitudinal axis of the catheter in the extension of a lateral opening of said catheter.

According to an embodiment, the inflatable balloon has a predefined inflated shape that defines the shape of the lateral channel.

According to an embodiment, the balloon comprises a generally hollow or toroid cylindrical shape.

According to an embodiment, the channel defines a substantially conical shape.

According to an embodiment, the balloon comprises a locating pin at the entry of the channel intended to cooperate with the outlet of a lumen of a catheter when the balloon is arranged on the distal end of the catheter. An advantage is to make it possible to improve the maintaining between the catheter and the balloon.

According to an embodiment, the balloon comprises two openings arranged on the inner surface of the balloon, the first opening defining the entry of the lateral channel and the second opening defining an inflation entry.

According to an embodiment, the catheter comprises a second opening cooperating on the one hand with the distal end of the second lumen and on the other hand with the opening of the balloon, the catheter comprising the second lumen.

According to an embodiment, the balloon comprises a preformed shape. When it is inflated, the balloon recovers a predefined shape.

According to another aspect, the invention relates to a usage of a device of the invention for the treatment of the vein of Marshall and of the anastomosis thereof. The treatment in particular relates to the alcoholization of this region for the purpose of carrying out a chemical ablation.

BRIEF DESCRIPTION OF THE FIGURES

Other characteristics and advantages of the invention shall appear when reading the following detailed description, in reference to the accompanying figures, that show:

FIG. 1: a cross-section view along a longitudinal plane of an embodiment of a device of the invention;

FIG. 2: a 3D view of an embodiment of a device of the invention;

DESCRIPTION

FIG. 1 shows an embodiment of a device of the invention as a longitudinal cross-section. The device 1 comprises a catheter 10 and a balloon 20. The longitudinal cross-section shows a catheter 10 comprising a plurality of lumens $LU_1$, $LU_2$, $LU_3$ as well as the balloon 20 associated with the catheter 10 in the device 1.

Lumen $LU_1$

Figure 6:
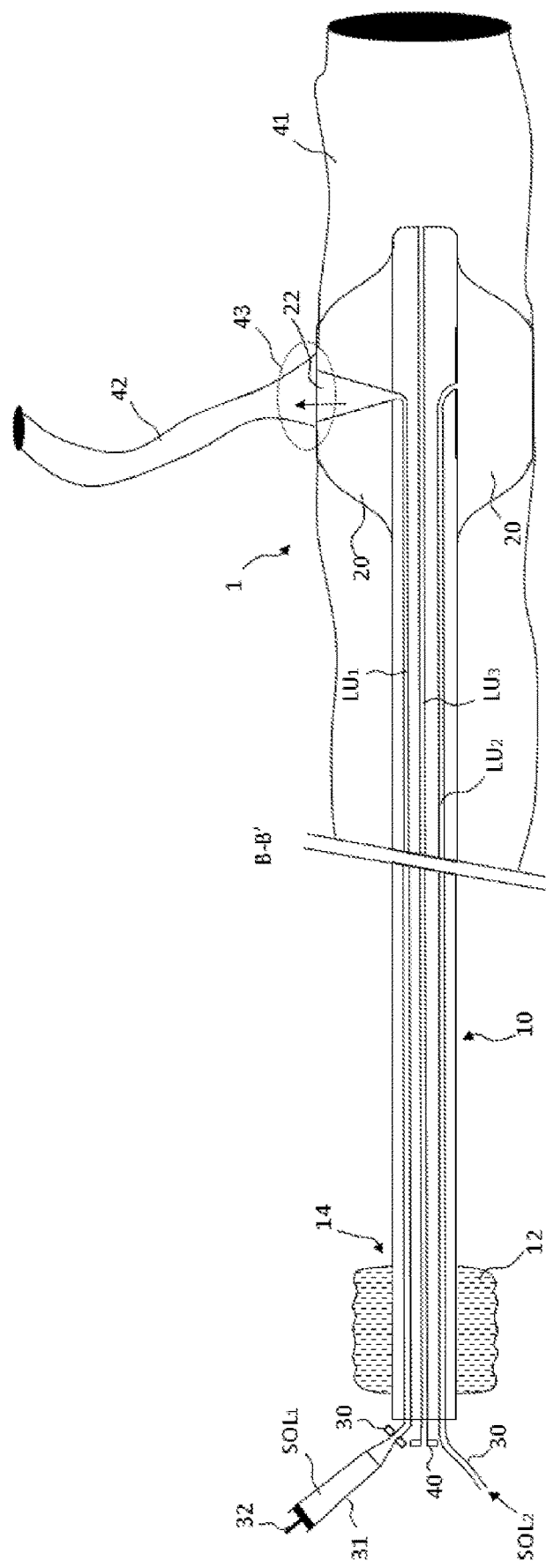
FIG. 6: a representation of an embodiment of a device arranged in the vicinity of the anastomosis of vessels 42 and 41.
Figure 8:
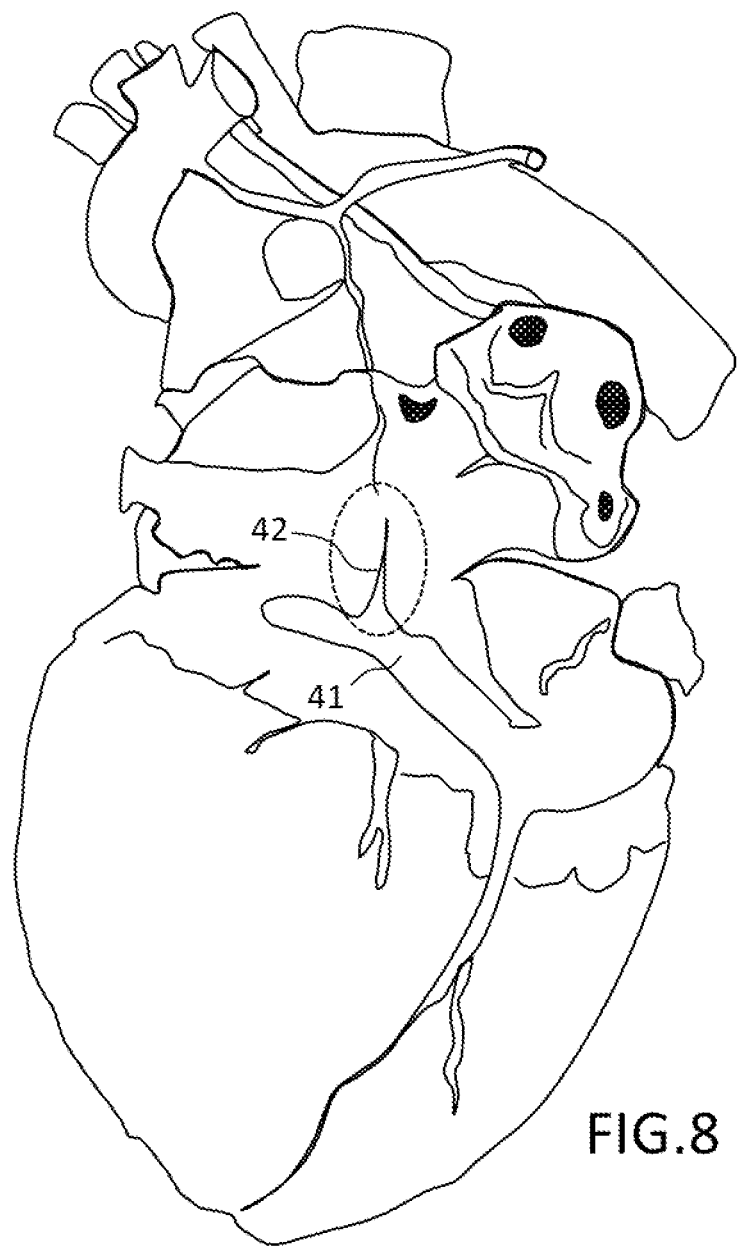
FIG. 8: a three-dimensional representation of a heart on the surface of which the vein of Marshall is shown.

The catheter 10 comprises a lumen $LU_1$ making it possible to convey for example a volume of a first solution $SOL_1$ intended to penetrate into a vessel 42, such as a vein. The invention is particularly advantageous when it is applied to the introduction of a volume of liquid $SOL_1$ in the vein of Marshall, since the device 1 of the invention makes it possible to reach the anastomosis 43 of the vein of Marshall 42 with sufficient precision for the solution to be able to penetrate into said vein such as is shown in FIG. 6. FIG. 8 shows a three-dimensional view of the vein of Marshall 42 at the surface of the myocardium.

According to an embodiment, the solution $SOL_1$ injected is an alcohol solution. An advantage is to treat the zone close to the anastomosis 43 in the solutions addressed to the problem of the AF.

According to another example, the solution $SOL_1$ injected is an iodine solution. An advantage is to make it possible to improve the quality of images acquired by a medical imaging system.

FIG. 1 shows an injector 31 comprising a solution $SOL_1$ to be injected into a channel 42 of the human body. A piston 32 is shown so as to illustrate the function aiming to engage the solution $SOL_1$ into the lumen $LU_1$. A valve 30 makes it possible in this example to open or not the passage to a volume of a solution $SOL_1$ to be transmitted. Furthermore, the valve can make it possible to remove a volume of air and/or to control the pressure inside the lumen $LU_1$. Other embodiments can be considered in order to generate a controlled pressure of the solution $SOL_1$ so that it can be injected into the zone to be treated by the lateral channel 23 that extends the lumen $LU_1$.

According to another example, the first lumen $LU_1$ allows for the passage of a guide in order to reach a zone of the vessel 42. According to another example, the first lumen $LU_1$ can be sized to allow for the passage of an angioplasty balloon, such as a small balloon for distally injecting into the vein 42. An advantage is to make it possible to reach, for example, the inside of the vein of Marshall using a guide while still making it possible to successively treat the zone 43 forming a mouth of the vessel 42 with the vessel 41 by injection of a solution $SOL_1$ of the alcohol type. In a particular application case, the vessel 41 is the coronary sinus and the vessel 42 is the vein of Marshall.

According to an embodiment, the first lumen $LU_1$ is a lumen of diameter 4F.

Balloon

According to an embodiment, the device 1 of the invention comprises a balloon 20 arranged at the distal end 13 of the catheter 10. The balloon 20 is fixed to the outer surface of the catheter 10 in such a way as to have an outlet 21' of the lumen $LU_1$ cooperate with a channel 23 formed by the balloon 20. The channel 23 has at its ends an inlet 21 arranged facing the outlet 21' of the first lumen $LU_1$ and a lateral opening 22. The channel 23 is designed to direct the volume of a solution $SOL_1$ injected from the first lumen $LU_1$ to the lateral opening 22 of the balloon 20. One of the advantages of the invention is to be able to direct a flow laterally in the direction of the catheter.

According to another embodiment, the minimum diameter of the channel 23 can be sized for the passage of an operator guide so as to allow for the insertion of a guide into the vessel 42. In a particular embodiment, the opening of the channel 23 makes it possible to inject a solution $SOL_1$ and/or a guide.

FIG. 6 shows, indeed, a vein of Marshall 42 opening out onto a vein 41. The catheter 10 is introduced into the vein 41 in such a way as to present the lateral opening 22 of the balloon with respect to the anastomosis 43 of the vein of Marshall 42. The solution $SOL_1$ then flows in the vein of Marshall 42 to carry out a treatment. An advantage of the invention is to make it possible to treat the zone 43 that would not have been treated if an arm of a member of a catheter of the prior art had penetrated into the vein 42.

Figure 5:
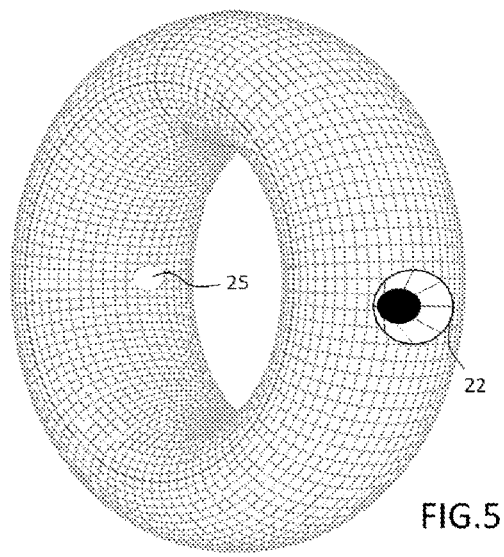
FIG. 5: a 3D view of an embodiment of a balloon of the invention.

According to an embodiment, the balloon 20 forms an inflatable element extending circumferentially over a portion of the surface of the catheter 10. The balloon 20 can comprise, according to the embodiments, a toroid shape such as is shown in FIG. 5. According to another example, the balloon 20 can have a hollow cylindrical shape, such as is shown in FIG. 2, so as to form a central hollow channel for the passage of the catheter 10.

According to another embodiment, the balloon 20 has a shape extending progressively from the circumference of the catheter to the maximum radius thereof. An example is shown in FIG. 6. The balloon 20 can therefore comprise different shapes in such a way that it ensures a first function of sealing with respect to the wall of the vessel 41 wherein the catheter 10 is introduced and a second function of conveyance in order to reach the anastomosis of a second vessel 42.

According to other examples, the balloon 20 can comprise different three-dimensional shapes, preferably with symmetries of revolution. According to an embodiment, the balloon 20 comprises an elastic or plastic material that makes it possible to obtain a very good adaptation of the shape of the balloon 20 in contact with the wall of the vessel 41. According to an embodiment, the wall of the balloon 20 is made from a polymer material.

According to an embodiment, the channel 23 comprises a flared shape of which the outer outlet diameter is greater than the inlet diameter cooperating with the outlet of the lumen $LU_1$. The shape of the channel 23 can be form example conical.

According to another embodiment, the channel 23 forms a symmetric cylinder of which the outlet diameter is substantially equal to the inlet diameter.

Figures 3, 4:
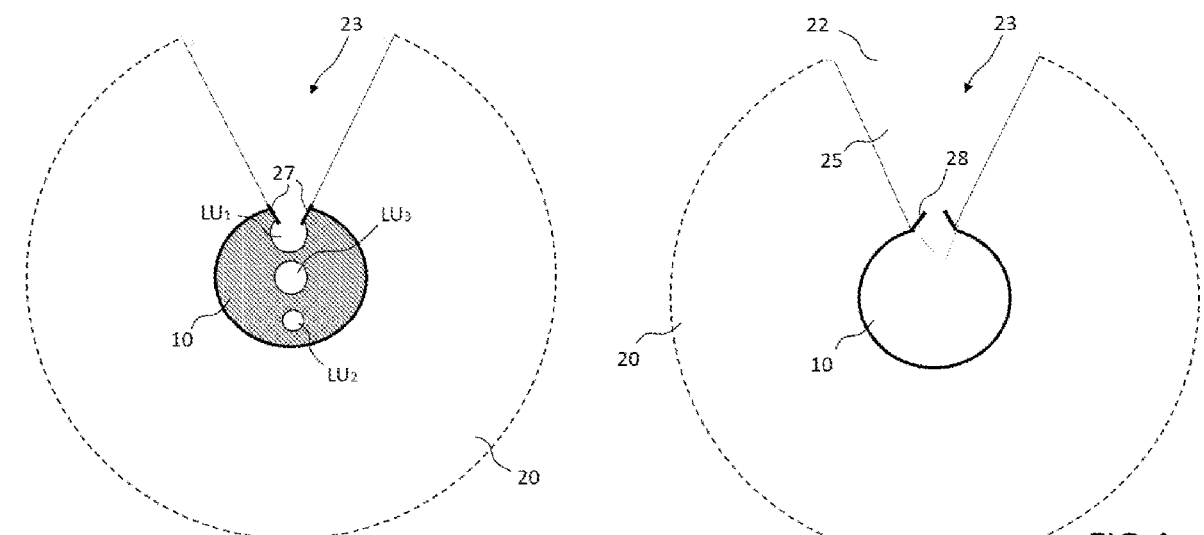
FIG. 3: a cross-section view along a lateral plane of an embodiment of a device of the invention.
FIG. 4: a cross-section view along a lateral plane of an embodiment of a balloon of the invention.

According to an embodiment, the balloon 20 comprises a locating pin 27 making it possible to secure the opening 21 of the balloon 20 with the outlet 21' of the first lumen $LU_1$. An example of a locating pin 27 is shown in FIG. 3. It is then arranged in such a way as to be introduced into the outlet mouth of the first lumen $LU_1$, thus the locating pin makes it possible to maintain the channel 23 in the continuity of the first lumen $LU_1$.

According to another embodiment such as shown in FIG. 4, the locating pin 28 is arranged in the continuity of the first lumen and forms a protrusion outside the surface of the catheter 10. The first lumen $LU_1$ then comprises in its extension a termination that forms the locating pin 28.

An advantage of the presence of the locating pin 27 or 28 is to ensure good continuity of the first lumen $LU_1$ to the channel 23. Furthermore, the pin improves the seal of the duct formed by the channel 23 and the first lumen $LU_1$. Finally, it makes it possible to control the correct orientation of the channel 23 during the inflation of the balloon 20.

Another advantage is to make it possible to have a consumable balloon that can be adapted to a given catheter. The locating pin makes it possible to define an adjustable junction element and that can absorb a certain clearance.

According to an embodiment, there is no locating pin 27, 28. The interface 21-21' is directly provided by a continuity between the outlet 21' of the first lumen $LU_1$ and by the inlet 21 of the channel 23. This embodiment is advantageous when the balloon 20 is directly fixed to the surface of the catheter 10, for example, by gluing.

According to an embodiment, the balloon 20 is preformed in such a way as to form the shape of the channel 23 when the balloon 20 is inflated. According to another example, a deformable mechanical element is sewn in the balloon in such a way as to define a predefined shape of the channel 23 when the balloon 20 is inflated. According to another example, the deformable mechanical element is glued or welded. According to an embodiment, the channel 23 is rigidified by a material or a reinforcing element. This makes it possible to prevent the blockage of the channel 23 during the inflation of the balloon 20.

Figure 7:
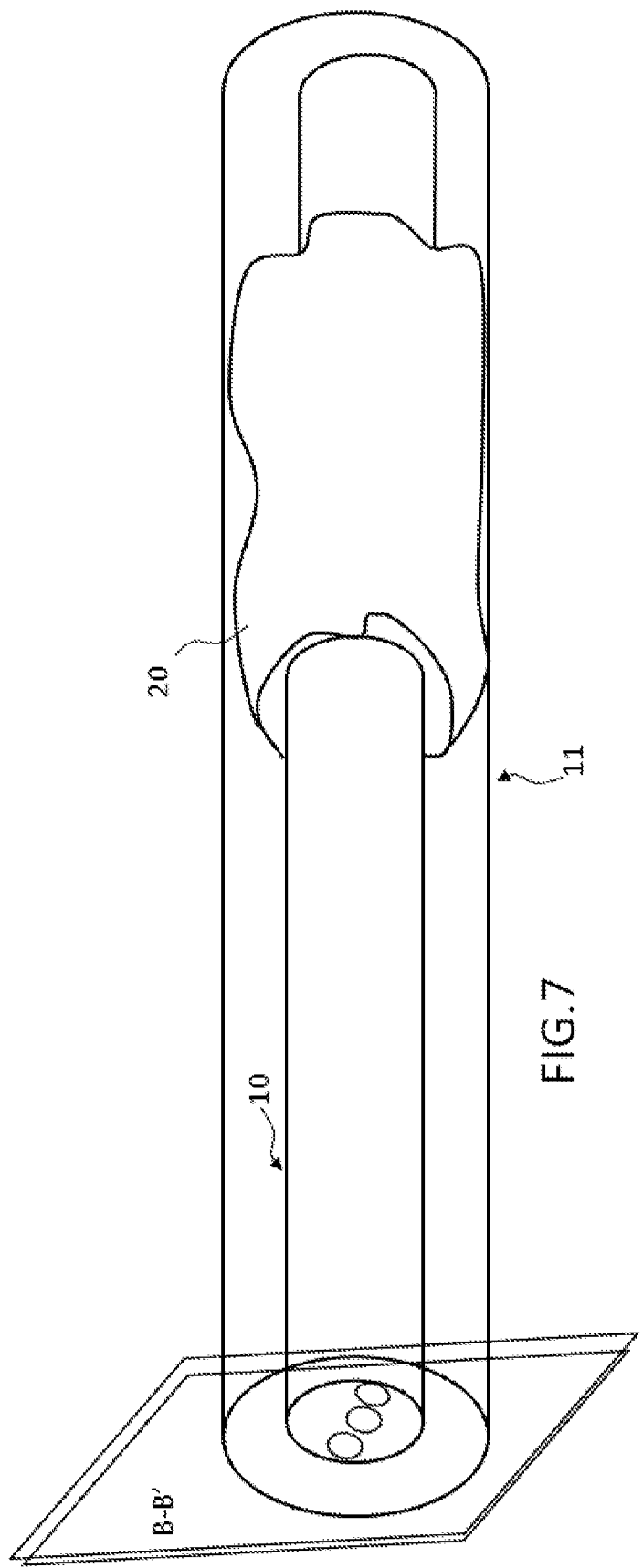
FIG. 7: a representation of an embodiment of a device of the invention comprising a sheath.

According to an embodiment, the balloon 20 can be in two states:
  a deflated state, for example used to facilitate the passage of the catheter 10 to the vein of Marshall, FIG. 7 shows an embodiment;
  an inflated state, for example, used during an operation of injecting a volume or the passage of a guide in the channel 23.

An interest in using the balloon 20 is to limit the reflux of the alcohol introduced to treat the vein of Marshall 42 that would be able to return in the vessel 41. The balloon 20 then forms a sealing element that ensures that the solution of alcohol $SOL_1$ is not diffused in vessels other than the vein of Marshall 42, in particular in the vessel 41 into which the catheter 10 is introduced.

Second Lumen $LU_2$

According to an embodiment, the balloon 20 can be inflated by a second lumen $LU_2$. According to an embodiment, the second lumen $LU_2$ is integrated to the catheter 10, according to another embodiment, the lumen $LU_2$ can be arranged on the outer surface of the catheter 10.

The second lumen $LU_2$ comprises an inlet 35 in such a way as to have an interface with an injector of pressurized gas, for example air or a liquid for the inflation. The solution injected to inflate the balloon is called $SOL_2$. The lumen $LU_2$ comprises an outlet 25' cooperating with an inlet 25 of the balloon 20.

According to an embodiment, the cooperation of the interface 25-25' is carried out at the surface of the catheter 10, in such a way that the second lumen $LU_2$ opens out laterally to the inner hollow surface of the balloon.

According to another embodiment, when the second lumen $LU_2$ is arranged to the outside of the catheter 10 as is shown in FIG. 2, the interface 25-25' is carried out on a proximal surface of the balloon 20 in such a way as to allow an inflation from the outside of the catheter 10. The lumen $LU_2$ extends, for example, along the catheter 10 to which it is fixed. According to an embodiment, a guide rail makes it possible to maintain the second lumen $LU_2$ on the catheter 10.

According to an embodiment, the second lumen $LU_2$ comprises a locating pin or a junction element that makes it possible to ensure that the volume $SOL_2$ introduced is indeed directed to the inside of the balloon 20. According to an embodiment, the locating pin of the second lumen $LU_2$ can be of the type of that cooperating with the interface 21-21'. According to another embodiment, the locating pin, where applicable, can be arranged on the interface 25 of the balloon 20.

According to an example, the second lumen $LU_2$ has a diameter comprised between 1 and 1.5 F.

Third Lumen, $LU_3$

According to an embodiment, the catheter 10 comprises a third lumen $LU_3$. According to an example, this lumen can be coaxial to the catheter 10. An advantage is to be able to pass for example a guide that ensures the stability of the catheter 10 into a vessel 41, for example a blood vessel such as the coronary sinus.

According to an embodiment, the third lumen $LU_3$ opens out onto a distal opening 17 of the catheter 10. The diameter of the opening 17 can be adapted to the introduction of a solution such as a contrast product and/or to the passage of a guide. A guide can, indeed, be adapted in the objective of stabilizing the catheter 10.

According to another embodiment, the third lumen $LU_3$ makes it possible to be used so as to deliver a revelator or a so-called "radiopaque" marker so as to improve the visibility of the positioning of the catheter 10 by means of a medical imaging system, such as an X-ray imaging system. By way of example, the third lumen $LU_3$ can be used to diffuse a volume of iodine within a vessel 41. An advantage is to improve the positioning of the catheter 10 in such a way that the channel 23 is precisely facing the outlet opening out of the vessel 42, such as shown in the zone 43, FIG. 6.

Advantageously, the inflation of the balloon 20 then the injection of iodine by the coaxial lumen $LU_3$ make it possible to carry out a venography of the coronary sinus in order to locate the vein of Marshall 42. This step can be carried out prior to the positioning of the channel 23 of the balloon 20 facing the anastomosis 43, i.e. at the ostium of the vessel 42. Then, the injection of alcohol into said vein 42 can be conducted with complete safety.

Another interest in the inflation of the balloon 20 is to block the flow of the vessel 41 which can no longer flow in the coronary sinus. The catheter 10 then allows for the introduction of a volume of alcohol at the anastomosis 43 of the vein of Marshall 42 without being affected by the flow of the vessel 41. The operation is thus facilitated by the presence of the balloon 20.

According to another embodiment, the third lumen $LU_3$ is a lumen of which the diameter is 2.5 F.

Catheter

According to an embodiment, the catheter 10 has a diameter of 7-9 F which allows it to have three lumens $LU_1$, $LU_2$, $LU_3$. According to an embodiment, the latter can be provided with a sheath 11 so as to be guided.

According to an embodiment, the device of the invention 1 further comprises a sheath 11 of a larger diameter than that of the catheter 10. The sheath 11 makes it possible to maintain the balloon 20 deflated on the surface of the catheter 10 during the guiding thereof at the anastomosis of the vessel 42. FIG. 7 shows an embodiment, wherein the sheath 11 makes it possible to maintain the balloon in a reduced space on the surface of the catheter 10. When the sheath 11 is introduced up to the vessel 42, it is then withdrawn in order to release the balloon 20 so that it can be inflated.

Advantageously, the sheath 11 allows for the guiding of the catheter 10 to the coronary sinus when it entails a treatment of the vein of Marshall. According to an embodiment, the sheath 11 is an interventional cardiology sheath.

An advantage of the device 1 of the invention is to make it possible to ensure several functions with a single device. The function of guiding, of introducing a revelator such as iodine, the introduction of a treatment solution of a vessel, such as alcohol, or activating the inflation or the deflation of an angioplasty balloon.

According to an embodiment, the catheter 10 comprises electrodes arranged and fixed to the distal surface of the body of the catheter making it possible to record the electrical activity in the vessel 41. According to an embodiment, the electrical signals collected by the electrodes are transmitted by means of a connector that passes through the catheter 10, for example in one of the available lumens. According to another embodiment, the electrical connector is integrated into the body of the catheter 10.

According to an embodiment, the catheter 10 can be deflected. The deflection is controlled by a proximal handle 12. The catheter 10 can be, for example, guided using a proximal handle 12. This is referred to as a catheter rendered deflectable and therefore able to be oriented in order to facilitate the introduction into the coronary sinus then into the ostium of the vein of Marshall.

According to another aspect, the invention relates to an application of an inflatable balloon 20 of the invention in order to form a device for treating the vein of Marshall.

According to an aspect, the invention relates to a usage of the catheter of the invention so as to alcoholize the region of the vein of Marshall, more particularly inside the vein of Marshall and in the zone corresponding to the anastomosis of the latter with the coronary sinus. This usage can then be a preliminary step in the ablation of the atrial fibrillation by radio frequency.

According to another aspect, the invention relates to a method of treatment of the vein of Marshall.

The method comprises:
an introduction of a device of the invention into the coronary sinus;
an introduction of a solution of the revelator type, for example iodine, so as to improve the contrast of images acquired by an imaging system, said solution being introduced through the third lumen $LU_3$;
a positioning of the catheter 10 in such a way as to position the outlet of the balloon 20 substantially at the anastomosis of the vein of Marshall;
an inflation of the balloon 20 of the invention, said balloon 20 cooperating with:
an opening of the catheter 10 so as to extend the distal end of the first lumen $LU_1$ in a lateral channel 23;
the distal end of a second lumen $LU_2$ to inflate the balloon 20,
a control of the positioning of the channel 23 so that it opens out at the anastomosis of the vein of Marshall;
an introduction of a treatment solution into the first lumen so that it is guided in the anastomosis zone and inside the vein of Marshall.

According to an embodiment, the treatment solution is an alcohol solution. According to an embodiment, a test liquid is introduced before the treatment solution into the first lumen $LU_1$ so as to verify the seal of the balloon 20 with the wall of the coronary sinus 41. According to an example, the test liquid is a radiopaque contrast product.

An advantage of the catheter 10 of the invention is to facilitate the ablation of the AF. Indeed, the catheter 10 makes it possible to obtain a destruction of the muscular conduction tissue associated with the vein of Marshall. As specified hereinabove, the vein of Marshall and the muscular arborization thereof are involved in several ways in the process of atrial fibrillation.

The alcoholization of the vein of Marshall 42 by means of the device of the invention makes it possible to carry out a chemical ablation. For this purpose, the catheter 10 is introduced up to the anastomosis 43 of the vein of Marshall 42, the inflation of the balloon is then engaged until it orients the outlet of the channel 23 with respect to the anastomosis 43 of the vein of Marshall 42. The balloon 20 is inflated in such a way as to be in contact with the wall of the vessel 41, the coronary sinus. The contact provides the seal during the introduction of a volume of alcohol in the anastomosis 43 and in the vein of Marshall. Once the balloon is inflated, the catheter 10 positioned, a volume of alcohol is introduced into the lumen $LU_1$. An alternative means is to use an angioplasty material with the aforementioned disadvantages of the prior art.

In a complementary and optional manner, a second volume of alcohol can be introduced within the vein of Marshall 42 from a device introduced into the first lumen $LU_1$. This embodiment makes it possible to inject a volume of alcohol inside the vein 42 and so as to go beyond the zone directly in the vicinity of the anastomosis zone 43. For example, the device introduced is an angioplasty balloon.

Figure 9:
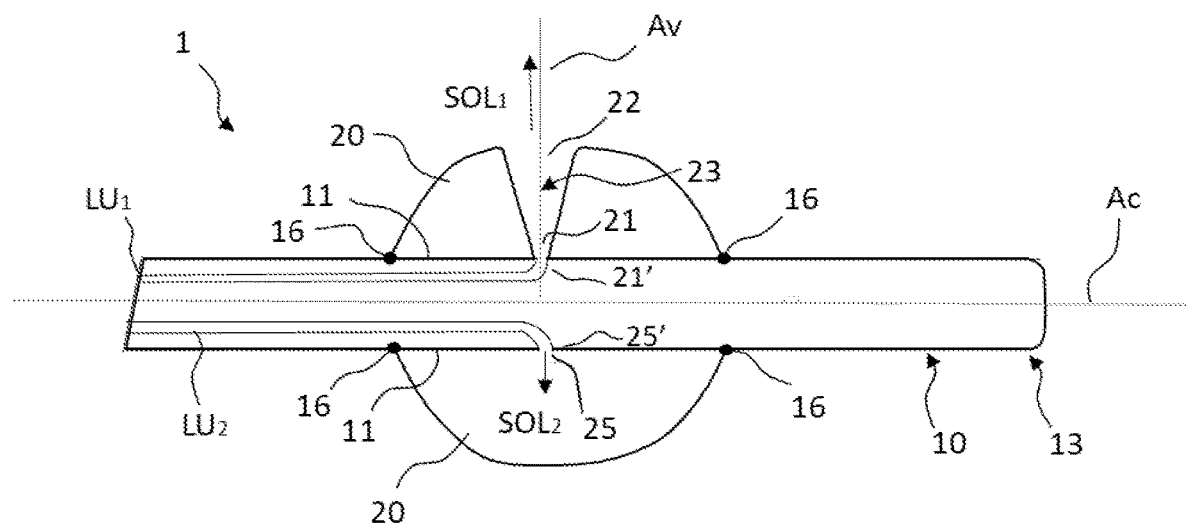
FIG. 9: an embodiment of the device of the invention wherein the balloon is crimped to the surface of the catheter.

FIG. 9 shows an alternative embodiment wherein the balloon 20 is crimped onto the body of the catheter 10. The balloon 20 is in this example crimped onto the circumference of the catheter 10. The junction 16 between the balloon 20 and the catheter 10 forms a ring. This junction is, for example, carried out using a tubular element with concentric clamping. In an example, the clamping of this tubular element is carried out by the exposure of said element to a physical field which can be for example thermal. In another example, the balloon 20 is welded by thermal melting. It is for example thermobonded. Other methods for fastening the balloon 20 on the catheter 10 can alternatively or jointly be carried out. According to other examples, the balloon 20 is glued or joined using an adhesive.

In the case of FIG. 9, the volume inflated by a gas or a liquid under pressure exerts a pressure on the wall of the balloon to inflate it and on the outer wall of the catheter 10.

In this case, a portion of the body of the catheter 10 forms a wall of the inflated volume obtained after inflation.

Figure 10:
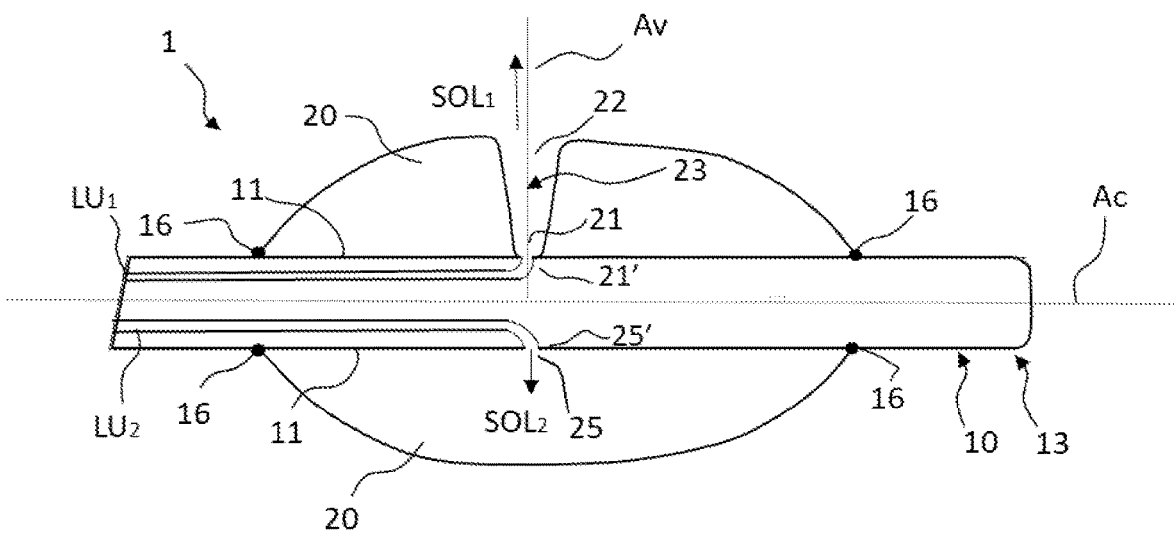
FIG. 10: an alternative embodiment of the device of the invention of FIG. 9 wherein the balloon is extended over a more substantial length of the catheter.

FIG. 10 shows an alternative wherein the balloon 20 extends over a longer distance along the catheter 10. An advantage is to carry out a border with the longer vessel 41. Consequently, this configuration provides a good seal between the treated zone and the upstream and downstream portions of the vessel 41.

In the embodiments of FIG. 9 and of FIG. 10 and in the preceding embodiments, the balloon is inflated until reaching the wall of the vessel 41 so as to form a sealed connection. According to an example, the channel 23 is preformed to obtain a directive shape during the inflation of the balloon 20 so as to orient the flow of the solution $SOL_1$ in the anastomosis zone 43. According to another example, the channel 23 is solely formed by the inflation of the balloon 20. Due to the fastening thereof around the opening 21, the inflation of the balloon makes it possible to form a channel 23 naturally.

According to an embodiment, the balloon 20 is fixed on the wall of the catheter 10 in two positions distant from the length of the balloon. The fastenings are preferably annular when the balloon is arranged on the entire circumference of the catheter 10. In this case the channel 23 is preferably centered between the two fastening zones of the balloon on the catheter. This solution provides a symmetry of inflation. The second lumen $LU_2$ opens out onto a lateral opening 25' of the catheter 10 so as to deliver a flow of gas or of a liquid $SOL_2$ for inflation. During the inflation, the gas or liquid for inflation is dispersed between the wall of the catheter 10 and the wall of the balloon 20. In this configuration, as in the preceding embodiments, the first lumen $LU_1$ opens out onto a lateral opening 21' of the catheter 10 and cooperates with the inlet 21 of the channel 23.

Figure 11:
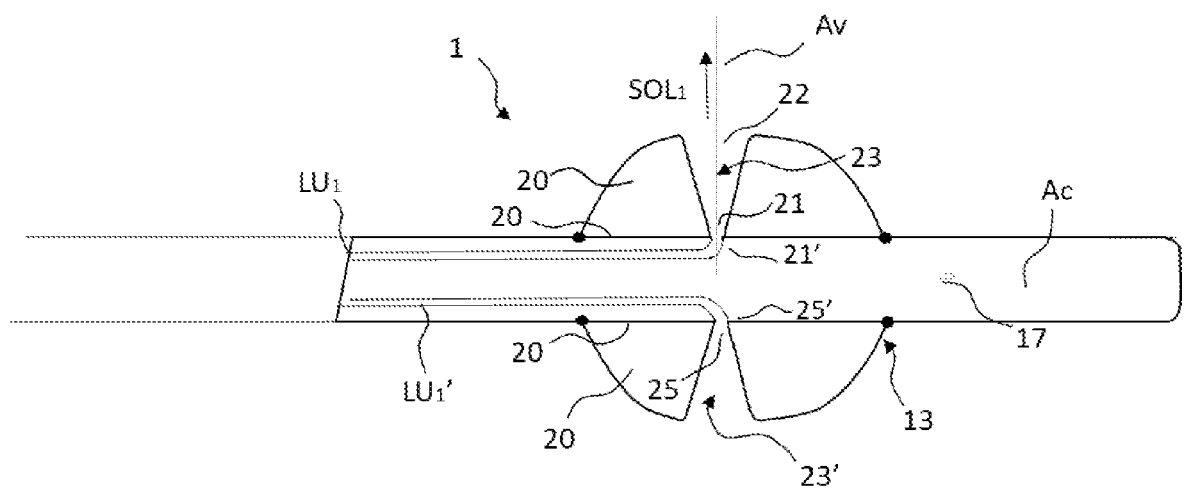
FIG. 11: an embodiment of the device of the invention wherein the balloon comprises two channels for conveying a treatment liquid into one or the other of the channels.

FIG. 11 shows a cross-section of a device 1 of the invention wherein the balloon 20 comprises two channels 23, 23'. The two channels 23, 23' are positioned within the balloon 20 on two opposite peripheral positions. In this case, two lumens $LU_1$, $LU_1'$ can be arranged to convey the solution $SOL_1$. According to another case, a single lumen $LU_1$ is arranged within the catheter 10 and is configured to address the solution $SOL_1$ either in the channel 23, or in the channel 23'. According to a first example, a means for directing the solution $SOL_1$ is activated in order to direct the outlet of the lumen $LU_1$ into one or the other of the channels 23, 23'. According to a second example, the lumen $LU_1$ may be able to be oriented and can be fixed to an outlet of the catheter 10 via a distal control. In the case of FIG. 11, the second lumen $LU_2$ is not shown. It can be arranged in a plane other than the cutting plane of FIG. 11.

This configuration makes it possible to facilitate the orientation of the catheter 10 in such a way as to position a channel 23 or 23' facing the anastomosis zone 43.

Figure 12:
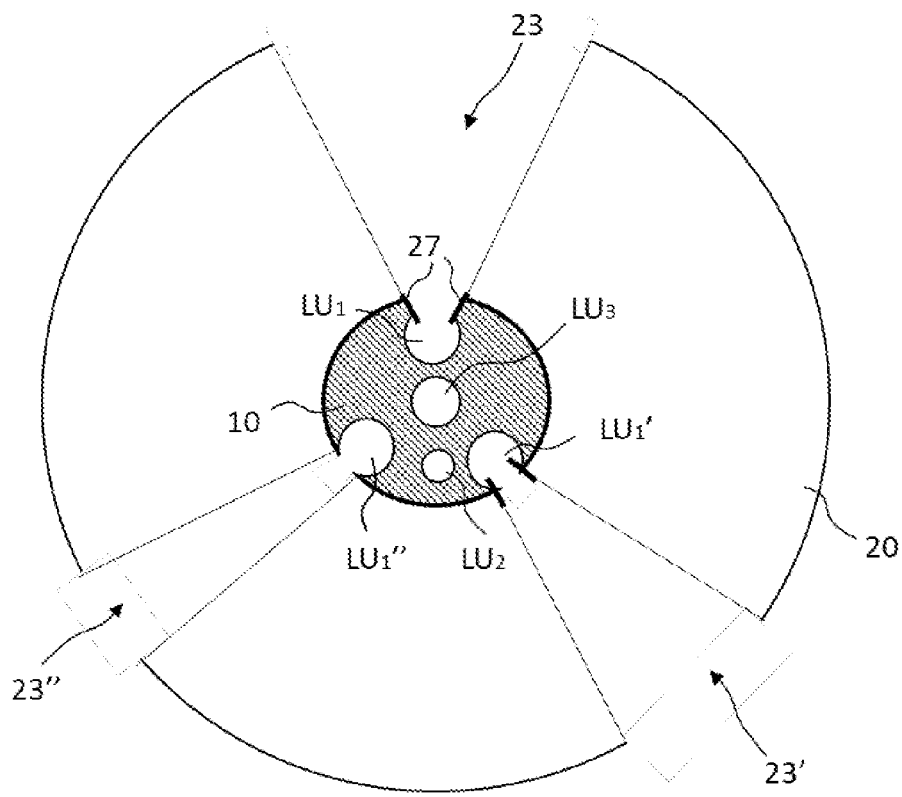
FIG. 12: an alternative of the embodiment of FIG. 11, wherein the device of the invention comprises a balloon that has three channels for potentially conveying a treatment liquid.

FIG. 12 shows an alternative of FIG. 11, wherein three channels 23, 23' and 23" are arranged within the balloon 20. In this embodiment, three lumens $LU_1$, $LU_1'$, $LU_1"$ possibly deliver a solution $SOL_1$ into one of the channels 23, 23' or 23". According to another configuration, a single lumen $LU_1$ is configured to deliver a solution $SOL_1$ in one of the channels 23, 23', 23". In this latter case, either the lumen $LU_1$ can be oriented, or a means of activation can be set up to direct the outlet of the lumen $LU_1$ to one of the three inlets of the channels 23, 23' or 23".

In the case of FIG. 12, the channels 23, 23' and 23" are preformed with a more or less directive opening. The channel 23 is more flared than the channel 23'. The channel 23' is more flared than the channel 23". In this case, the channel 23' makes it possible to direct the treatment liquid $SOL_1$ in a highly localized manner in the anastomosis zone 43.

An advantage of this configuration is to choose the channel 23, 23' or 23" that is best suited to the geometry of the anastomosis zone.

Another advantage is to design a balloon 20 that can be configured according to the cases of use, the physiognomy and the treatment protocol. Furthermore, such a balloon 20 comprising several channels of which the main orientations are spaced 120° to 180° preserves a substantial sealing zone between the three lateral openings 22 of the balloon 20. According to other configurations, the balloon can comprise a plurality of channels 23. When they are positioned according to the same secant plant of the main axis of the catheter, their main orientation is preferably spaced by at least 45° with respect to another channel.

According to another configuration, the balloon 20 can comprise channels 23 arranged according to the different planes parallel and secant to the axis of the catheter 10. Each secant plane is preferably perpendicular with respect to the axis Ac of the catheter 10.

The embodiments of FIGS. 11 and 12 are compatible with all the embodiments of device 1 of the invention.

Figure 13:
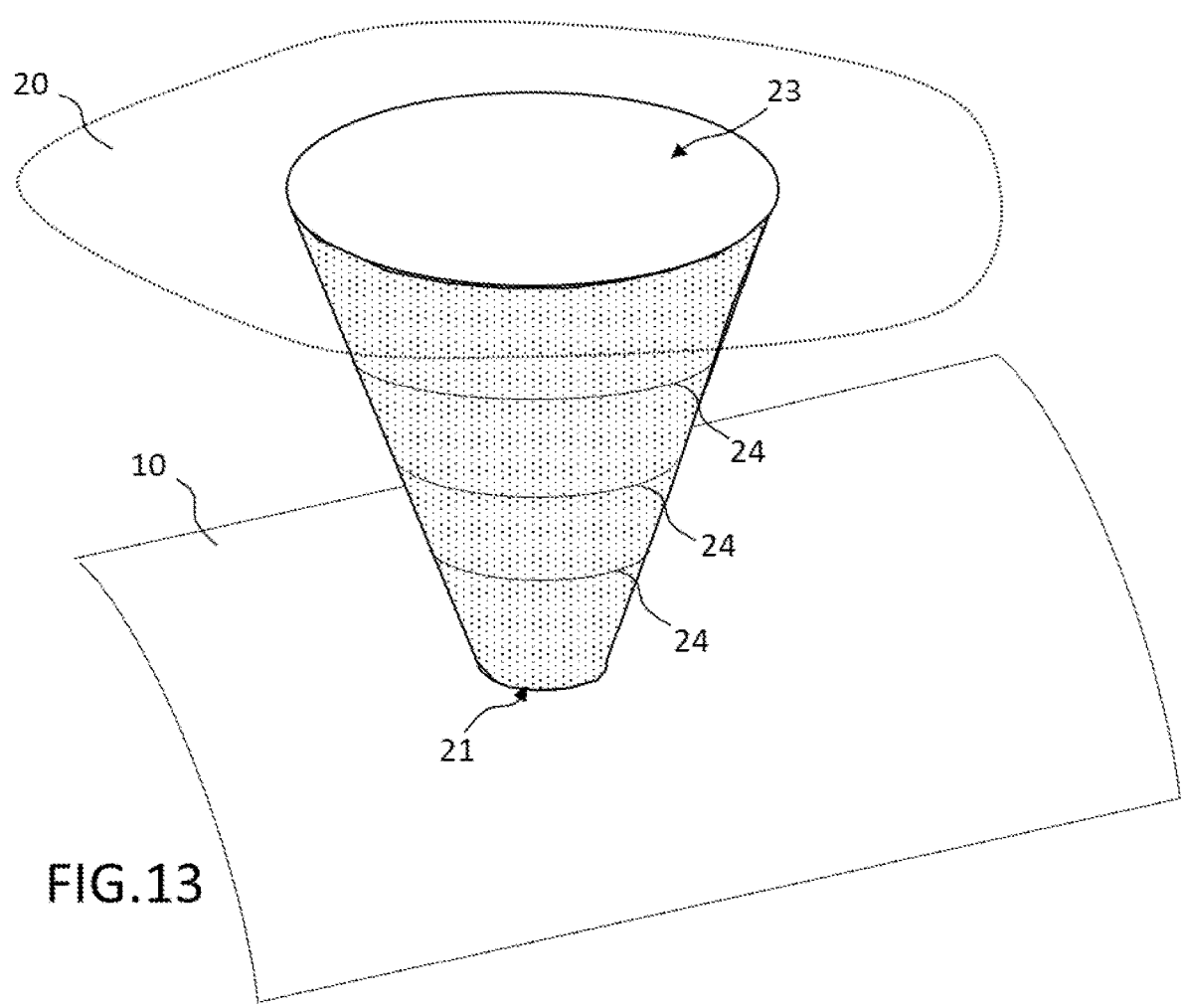
FIG. 13: an example of a preformed channel with at least one mechanical element forming a ring in order to force the shape of the channel during the inflation of the balloon.

FIG. 13 shows an example of a channel 23 comprising a preformed geometry that forces the geometry of the inflation of the balloon 1 at the channel 23.

The preformed channel 23 can be obtained by rings 24 that form a mechanical reinforcement that impose a cone shape on the channel 23. In this example, the cross-sections perpendicular to the main axis Av of the channel 23 are circles. According to other examples, the cross-sections can be conics, ovals or any shape that generates a substantially tubular shape.

According to another embodiment, the rigidification elements have an elasticity. This elasticity allows for a control of the deformation of the channel 23 according to the pressure inside the balloon 20. Consequently, the opening of the channel 23 can be controlled by an adjustment of the internal pressure of the balloon 20. The deformation of the rigidification elements changes according to a scale that depends on a predefined pressure range. The invention makes it possible to establish a link or a correspondence between a given pressure and a deformation of the given channel. Consequently, the invention makes it possible to modulate the volume of the channel 23. An advantage is to configure the directivity of the channel 23 in order to diffuse the solution $SOL_1$ in the anastomosis zone 43.

According to an example, the rigidification elements comprise an elasticity that depends on their distance at the surface of the catheter 10. Thus, it is possible to consolidate the base of the channel 23 and to configure the dispersion of the liquid at the outlet of the channel 23. When the elasticity of the rigidification elements is lower at the outer edge of the balloon 20, the inflation acts on the shape of the channel 23 at the outlet which will be more or less flared according to the inflation pressure.

A role of the balloon 20 is to form a sealed border against the wall of the vessel 41 in such a way that the solution $SOL_1$ does not flow upstream or downstream from the vessel 41. The solution $SOL_1$ is generally an alcohol solution that is toxic for the vessels, the balloon 20 must therefore be sufficiently inflated to carry out a sealed zone around the anastomosis zone 43.

Figure 14:
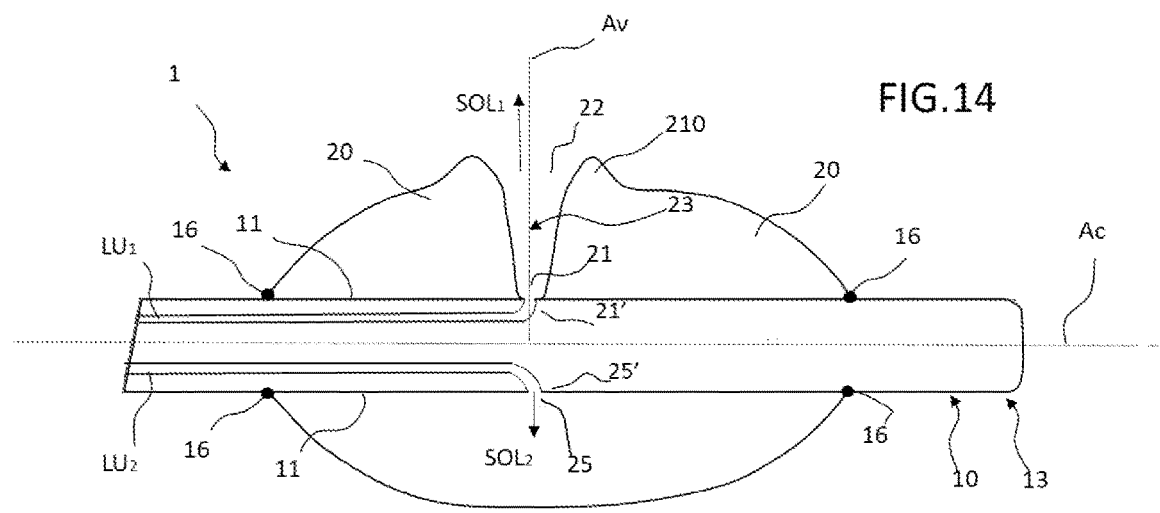
FIG. 14: an example of a balloon of the invention comprising lips that reinforce the seal with a channel that has a reduced circumference.

FIG. 14 shows an example of a device 1 of the invention comprising a balloon 20 that has a circumferential lip 210 at the end 22 of the channel 23. The circumferential lip 210 forms a ring around the outlet 22 of the channel 23. The lip 210 is formed by a portion of the surface of the balloon 20. In order to carry out a circumferential lip 210 around the axis Av of the channel 23, the balloon 20 can be preformed with a wider portion 210 that makes it possible to reinforce the seal when the balloon is inflated. The wider portion of the balloon 20 corresponds to a lateral extra thickness of the balloon 20. An advantage of this configuration is to increase the thickness of the balloon 20 around the anastomosis zone 43 which ensures a contact with a portion of the vessel 41 that is located in the vicinity of the anastomosis zone 43 or in the anastomosis zone 43.

Figure 15:
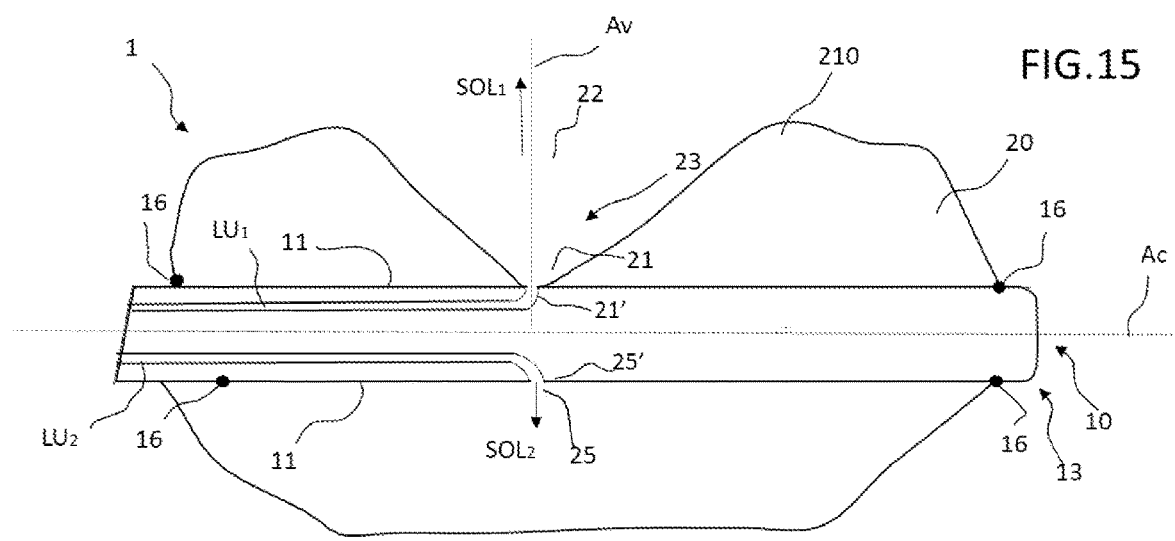
FIG. 15: an example of a balloon of the invention comprising a lip that reinforces the seal with a channel that has a flared opening.

FIG. 15 shows an example of a device of the invention comprising a balloon 20 that has a flared channel 23. The aperture angle 29 can be greater than 90° as is shown in FIG. 15. The channel 23 substantially forms a cone that forms the flared opening.

According to an embodiment, a circumferential lip 210 can be carried out at the outlet of the channel 23 on a circumferential portion surrounding the outlet 22 of the channel 23. According to another case, a flared opening can be carried out without a lip necessarily having to be carried out.

An advantage of a flared opening 22 is to increase the zone reached by the solution $SOL_1$ poured at the anastomosis zone 43.

According to an embodiment, the channel 23 is formed by the shape of the balloon 20. The balloon 20 is, for example, crimped, glued or fixed around the opening 21 of the catheter 10. When it does not comprise any reinforcement making it possible to carry out the shape of the channel 23, it is the inflation that forms the channel 23.

Figure 16:
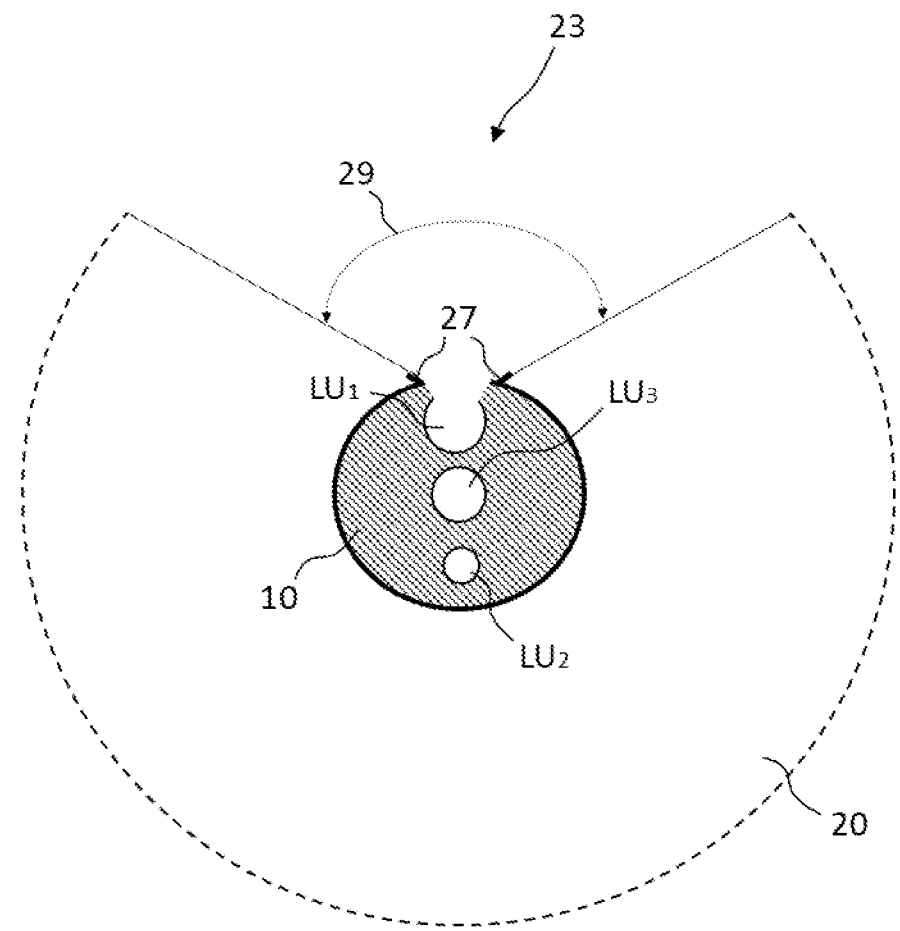
FIG. 16: a cross-section view along a lateral plane of an embodiment of a balloon of the invention that has a flared channel.
Figure 17:
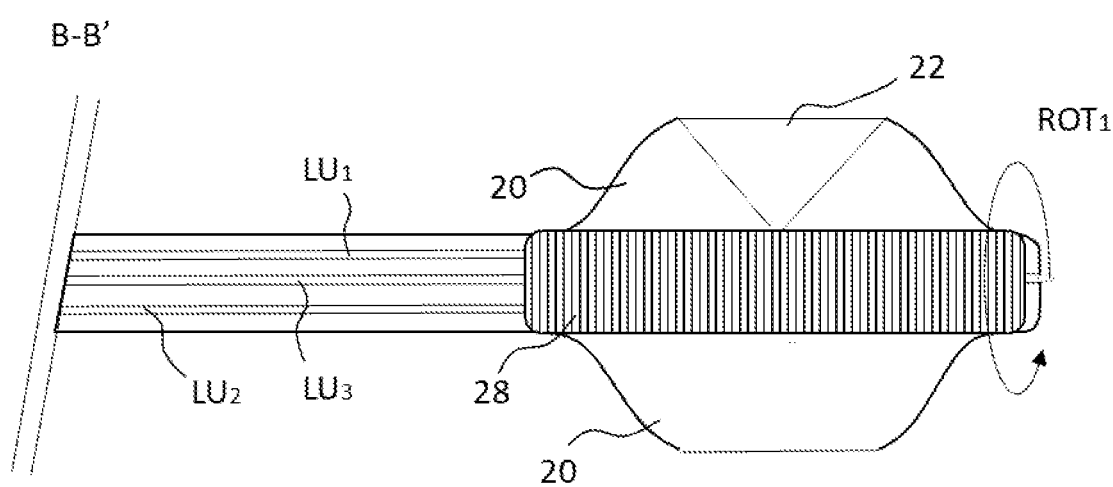
FIG. 17: a catheter according to an embodiment comprising a rotating portion whereon the balloon is arranged.

FIG. 16 shows a cross-section of the device 1 of the invention wherein a cross-section of the catheter 10 and a cross-section of the balloon 20 are shown. In this embodiment, the opening of the channel 23 is flared in such a way that the liquid $SOL_1$ introduced into the lumen $LU_1$ reaches the entire anastomosis zone 43. The angle 29 can be, for example, comprised between 90° and 180° for a flared shape. The balloon 20 is fixed to the catheter 10 at the junctions 27 so as to form a channel 23. An advantage is to allow for a diffusion in all of the anastomosis zone 43 while still maintaining a sealed contact between the balloon 20 and the wall of the vessels 41, In all the embodiments, the balloon 20 is inflated in order to carry out a sealed border with the wall of a vessel 41. This sealed border makes it possible to ensure, when it is inflated, the seal of an anastomosis zone 43 of two vessels 41, 42. Thus, the anastomosis zone 43 is reached by the channel 23 and a solution $SOL_1$ can be injected. The anastomosis zone 43 and the vessel 42 then extend the channel 23. The zone thus formed preserves the zones of the vessel 41 located upstream and downstream from the balloon 20 from the solution $SOL_1$ FIG. 17 shows an embodiment of a balloon 20 movable mounted on a portion of a catheter 10 of which the wall is 28 can pivot by a predefined angle. In this embodiment, the lumen $LU_1$ opens out, for example, onto an opening of the body of the catheter 10 that has the shape of an arc of a circle. Other embodiments of the catheter 10 are also possible in this embodiment of a pivotable portion 28. For example, the body 28 of the catheter 10 can comprise in its thickness a reservoir in order to make it possible to carry out substantial pivoting without having to carry out an excessively substantial opening. An advantage of this configuration is to simply orient the channel 23 with regards to the anastomosis zone 43. The controlling of the orientation can be done using an electromagnetic control. Indeed, the pivotable element 28 can be actuated by an electromagnet so as to determine a given angle with regards to an angular reference.

The invention claimed is:

1. A method for treating a vein of Marshall, the method comprising:
   introducing a medical device into a coronary sinus, the medical device comprising a catheter and a balloon arranged on a portion of a distal end of the catheter, said balloon being configured to form a sealed contact with a wall of a first vessel,
   said medical device comprising:
      a first lumen for an injection of a first volume of a treatment solution, the first lumen opening out laterally with respect to a longitudinal axis of the catheter into a distal opening of the catheter,
      a second lumen for an injection in order to convey a second volume comprising a gas or a liquid for an inflation of the balloon;
   said balloon comprising:
      an opening arranged to cooperate with a distal opening of the second lumen to permit an entry of the second volume in the balloon in order to ensure the inflation thereof and;
      a channel that opens out laterally with respect to the longitudinal axis of the catheter, the channel being constructed and arranged to extend from the distal opening of said catheter to an outlet of the balloon, and into which the first lumen opens to ensure an entry of the first volume into said channel,
   positioning the channel so that the channel opens out at an anastomosis zone of the vein of Marshall;
   inflating the balloon to form a sealed contact between a wall of the coronary sinus and a sealed zone around the anastomosis zone of the vein of Marshall to prevent the treatment solution from flowing into the coronary sinus, and
   introducing the first volume of the treatment solution into the first lumen so that the treatment solution is guided into the anastomosis zone of the vein of Marshall and inside the vein of Marshall via the channel without flowing into the coronary sinus.

2. The method according to claim 1, wherein a portion of a body of the catheter forms a wall of a volume obtained after the inflation of the balloon.

3. The method according to claim 1, wherein the balloon comprises a plurality of channels that open out laterally with respect to the longitudinal axis of the catheter.

4. The method according to claim 1, wherein the balloon comprises at least one reinforcing element around the channel.

5. The method according to claim 1, wherein the balloon comprises a circumferential lip arranged at a distal end of the channel, said lip making it possible to carry out a local increase in a thickness of the balloon.

6. The method according to claim 1, wherein the channel comprises a flared opening that has an aperture angle greater than 90°.

7. The method according to claim 1, wherein the balloon is fixed on a movable portion of the catheter, said movable portion being rotatably mounted about the longitudinal axis of the catheter.

8. The method according to claim 1, wherein the catheter comprises a second opening cooperating with a distal end of the second lumen and with the opening of the balloon, the catheter comprising the second lumen.

9. The method according to claim 1, wherein the medical device further comprises a third lumen suitable for the passage of a guide or of a liquid solution.

10. The method according to claim 1, wherein:
the first lumen comprises a diameter comprised between 2 F and 5 F, and;
the second lumen comprises a diameter comprised between 1 F and 1.5 F.

11. The method according to claim 10, wherein:
the diameter of the first lumen is 4 F, and;
the diameter of the second lumen is 1.2 F.

12. The method according to claim 1, wherein the catheter comprises at least one electrode arranged at a surface of a distal end of a body of the catheter making it possible to record an electrical activity in the vessel.

* * * * *